(12) United States Patent
Sawahata et al.

(10) Patent No.: US 6,294,639 B1
(45) Date of Patent: Sep. 25, 2001

(54) LIQUID CRYSTAL ALIGNING AGENT

(75) Inventors: Kiyoshi Sawahata; Hideyuki Nawata; Takayasu Nihira; Yoshikazu Ohtsuka; Yasuyuki Nakajima, all of Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/554,622

(22) PCT Filed: Dec. 1, 1998

(86) PCT No.: PCT/JP98/05409

§ 371 Date: Jun. 2, 2000

§ 102(e) Date: Jun. 2, 2000

(87) PCT Pub. No.: WO99/28783

PCT Pub. Date: Jun. 10, 1999

(30) Foreign Application Priority Data

Dec. 2, 1997 (JP) .................................................. 9-331471

(51) Int. Cl.[7] ........................ C08G 73/10; G02F 1/1337
(52) U.S. Cl. ........................ 528/170; 528/353; 528/188; 428/1.1; 428/1.2; 428/1.26; 428/473.5
(58) Field of Search ..................................... 428/1.1, 1.26, 428/1.2, 473.5; 528/353, 170, 188

(56) References Cited

U.S. PATENT DOCUMENTS

| | | | |
|---|---|---|---|
| 5,858,274 | 1/1999 | Mishina et al. | 528/188 |
| 5,954,999 | 9/1999 | Mishina et al. | 252/259.4 |
| 6,139,917 | * 10/2000 | Sano et al. | 525/436 |

FOREIGN PATENT DOCUMENTS

| | | |
|---|---|---|
| 7-209649 | 8/1995 | (JP) . |
| 7-209655 | 8/1995 | (JP) . |
| 8-328017 | 12/1996 | (JP) . |

* cited by examiner

Primary Examiner—P. Hampton-Hightower
(74) Attorney, Agent, or Firm—Oblon, Spivak, McClelland, Maier & Neustadt, P.C.

(57) ABSTRACT

The present invention relates to a treating agent for liquid crystal alignment, which comprises a polyamic acid compound having a reduced viscosity of from 0.05 to 5.0 dl/g (in N-methylpyrrolidone at a temperature of 30° C. at a concentration of 0.5 g/dl) and containing repeating units represented by the general formula [I]:

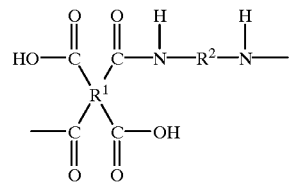

[I]

(wherein $R^1$ is a tetravalent organic group constituting a tetracarboxylic acid which has an alicyclic structure having from 2 to 5 rings condensed and wherein all the carbonyl groups are directly bonded to the alicyclic structure and said carbonyl groups are not bonded to adjacent carbon atoms in the alicyclic structure, and $R^2$ is a bivalent organic group constituting a diamine), or a polyimide resin obtained by imidizing said polyamic acid compound, and a liquid crystal alignment film and a liquid crystal device employing it.

12 Claims, No Drawings

LIQUID CRYSTAL ALIGNING AGENT

BACKGROUND OF THE INVENTION

1. Technical Field

The present invention relates to a treating agent for liquid crystal alignment to be used for liquid crystal devices such as a liquid crystal display device, and a liquid crystal alignment film and a liquid crystal device utilizing it. More particularly, it relates to a treating agent for liquid crystal alignment, which is excellent in the printing properties to a substrate, which will be free from separation from the substrate during rubbing, which provides an alignment film which will be less likely to be damaged by rubbing, and which provides an excellent voltage holding property when a liquid crystal cell is operated, and a liquid crystal alignment film and a liquid crystal device employing it.

2. Background Art

A liquid crystal display device is a display device utilizing an electrooptical change of liquid crystal, and as an apparatus, it is small in size and light in weight and has an attractive feature such that the power consumption is small. Accordingly, in recent years, it has undergone remarkable developments as a display device for various types of displays. Among them, an electric field effect type liquid crystal display device of twisted nematic type (TN type) is a typical one, wherein nematic liquid crystal having positive dielectric anisotropy is employed, liquid crystal molecules are aligned at the respective interfaces of a pair of electrode substrates disposed to face each other, in parallel with the substrates, and the substrates are combined so that the alignment directions of liquid crystal molecules will cross each other. Further, among the TN type liquid crystal devices, an active matrix operation system utilizing a TFT (Thin Film Transistor) having excellent display performance, has been actively developed.

In such a TN type liquid crystal display device, it is important that long axes directions of liquid crystal molecules are uniformly aligned in parallel on the substrate surface and further that liquid crystal molecules are aligned with a certain tilt angle to the substrate. As a method for aligning liquid crystal molecules in such a manner, a rubbing treatment has been usually employed. The rubbing treatment is a method wherein an organic coating film is formed on the surface of a substrate, and the surface is rubbed with a cloth of e.g. cotton, nylon or polyester in a predetermined direction, so that liquid crystal molecules are aligned in the direction of rubbing. By this method, stabilized alignment can be obtained relatively easily, and industrially, this method is mainly employed. As the organic film, polyvinyl alcohol, polyoxyethylene, polyamide or polyimide may, for example, be mentioned. However, from the viewpoint of chemical stability, thermal stability, etc., polyimide is most commonly employed.

With respect to the treating agent for liquid crystal alignment using a polyimide, commonly, a varnish having a solvent-soluble type polyimide dissolved in a solvent is coated on a substrate followed by baking to form a polyimide film, and then rubbing treatment is carried out thereon to obtain a liquid crystal alignment film, or a solution of a polyamic acid as a polyimide precursor, is coated on a substrate, generally followed by baking at a temperature of at least 150° C. for imidization, and then rubbing treatment is carried out thereon to obtain a liquid crystal alignment film.

As basic properties required for such an alignment film, the tilt angle of liquid crystal molecules, the voltage holding ratio and charge-accumulation property by direct current voltage, may, for example, be mentioned, and the voltage holding property is an important property from the viewpoint of the constitution of the device, particularly in the TFT display system. It has been known that such properties of an alignment film greatly depend on the liquid crystal species to be used, but they are influenced also by the structure of the polyimide to be used. Accordingly, it has been attempted to improve film properties by variously selecting the structure of the polyimide.

With respect to the liquid crystal alignment film formed by a solvent-soluble polyimide, it has been known that usually baking can be carried out at a low temperature and excellent voltage holding property can be obtained. However, there has been such problems that the tilt angle is not adequate or its stability is not adequate, or the charge-accumulation property is not adequately low. Further, there has been such a problem that e.g. the printing properties and adhesive properties to a substrate are poor.

On the other hand, the liquid crystal alignment film using a polyamic acid as a polyimide precursor, has such advantages that a high and more stable tilt angle can be obtained and the charge-accumulation property by the direct-current voltage can be made small, and further, the printing properties and adhesive properties to a substrate are excellent. However, it has such drawbacks that the voltage holding property is poor, or the solvent resistance at the surface of the film is poor in the case where the imidization degree is insufficient.

From the viewpoint of the production of a liquid crystal display device, properties such as adhesive properties and printing properties of the alignment film to a substrate, and rubbing resistance, are important. Particularly in rubbing treatment, which is an industrially employed method for treating liquid crystal alignment, there are such problems that the liquid crystal alignment film may be separated off from the substrate due to abrasion during rubbing, or the liquid crystal alignment film may be damaged, thus influencing over display properties.

Further, from the viewpoint of reliability and environmental resistance of the display device, an alignment treating agent having excellent alignment film properties, particularly voltage holding property, at a high temperature, has been required. Namely, a fluorine type liquid crystal is widely used for a display device of TFT operation system, and it has been known that usually the voltage holding property tends to be high in the case of using this liquid crystal. However, even in a case where the voltage holding ratio is high at the beginning, a display failure such as display unevenness may be caused during a long-term use of the liquid crystal display device in some cases, and the reliability is not adequately high. Further, in the case where liquid crystal for low-voltage operation is used, the voltage holding property may decrease, and an adequately high reliability can hardly be obtained, such being problematic.

As mentioned above, both solvent-soluble polyimide and polyamic acid have merits and demerits which are in an antinomic relation to each other as a liquid crystal alignment film, and it is not necessarily easy to satisfy all properties required as a liquid crystal alignment film. However, a treating agent for liquid crystal alignment, which is particularly excellent in the printing properties to a substrate, the adhesive properties and rubbing resistance, and which has a high reliability, has been desired.

The present invention has been made to overcome the above problems. Namely, it is an object of the present invention to provide a treating agent for liquid crystal alignment, which is excellent in the adhesive properties and the printing properties to a substrate, which is free from separation from the substrate during rubbing, which provides an alignment film which is less likely to be damaged by rubbing, and which provides an excellent voltage holding property regardless of the type of liquid crystal when a liquid crystal cell is operated.

DISCLOSURE OF THE INVENTION

The present inventors have conducted extensive studies to overcome the above problems, and as a result, the present invention has been accomplished. Namely, the present invention relates to a treating agent for liquid crystal alignment, which comprises a polyamic acid compound having a reduced viscosity of from 0.05 to 5.0 dl/g (in N-methylpyrrolidone at a temperature of 30° C. at a concentration of 0.5 g/dl) and containing repeating units represented by the general formula [I]:

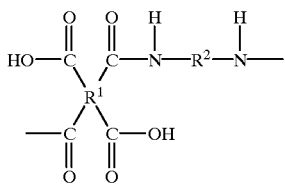

[I]

(wherein $R^1$ is a tetravalent organic group constituting a tetracarboxylic acid which has an alicyclic structure having from 2 to 5 rings condensed and wherein all the carbonyl groups are directly bonded to the alicyclic structure and said carbonyl groups are not bonded to adjacent carbon atoms in the alicyclic structure, and $R^2$ is a bivalent organic group constituting a diamine), or a polyimide compound obtained by imidizing said polyamic acid compound, and a liquid crystal alignment film and a liquid crystal display device employing it.

BEST MODE FOR CARRYING OUT THE INVENTION $R^1$ in the general formula [I] of the present invention is preferably a tetravalent organic group constituting a tetracarboxylic acid represented by the general formula [II]:

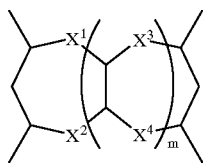

[II]

(wherein each of $X^1$, $X^2$, $X^3$ and $X^4$ which are independent of one another, is a single bond or a methylene group, and m is an integer of from 1 to 3). More preferably, m in the general formula [II] is 1 or 2, particularly preferably m is 1.

Specific examples of the tetracarboxylic acid having the tetravalent organic group constituting the tetracarboxylic acid represented by the general formula [II] wherein m is 1 of the present invention, include tetracarboxylic acids such as bicyclo[3,3,0]-octane-2,4,6,8-tetracarboxylic acid:

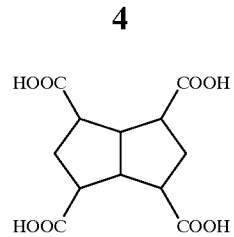

bicyclo[4,3,0]nonane-2,4,7,9-tetracarboxylic acid:

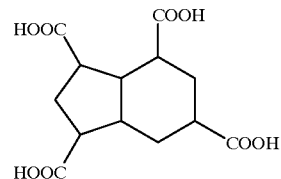

bicyclo[4,4,0]decane-2,4,7,9-tetracarboxylic acid:

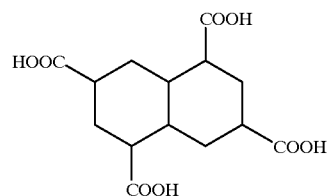

bicyclo[4,4,0]decane-2,4,8,10-tetracarboxylic acid:

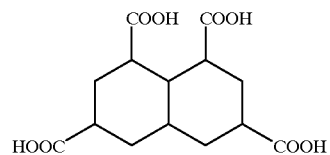

and dianhydrides thereof. Specific examples of the tetracarboxylic acid wherein m is 2, include tetracarboxylic acids such as tricyclo[6.3.0.0<2,6>]undecane-3,5,9,11-tetracarboxylic acid:

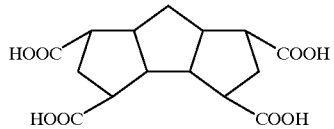

and dianhydrides thereof. Among them, more preferred is bicyclo[3,3,0]octane-2,4,6,8-tetracarboxylic acid from the viewpoint of stability of the liquid crystal alignment.

Further, these tetracarboxylic acids have structural isomers, and one type of the isomers may be used or a mixture of the isomers may be used. Particularly, bicyclo[3,3,0]octane-2,4,6,8-tetracarboxylic acid has isomers as represented by the formulae [IV], [V] and [VI]:

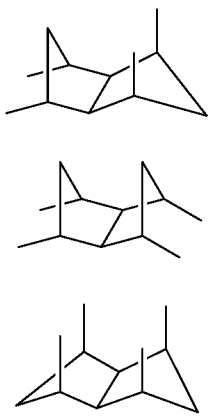

[IV]

[V]

[VI]

One type of the isomers may be used, or a mixture thereof may be used, to obtain the effect of the present invention. However, from the viewpoint of the polymerization reactivity, the content of the isomer [IV] is preferably at least 90%, more preferably at least 95%.

Bicyclo[3,3,0]octane-2,4,6,8-tetracarboxylic acid and its dianhydride can be synthesized, for example, by the following method. Namely, 2,5-novolunadiene and dicyclopentadiene are reacted in an autoclave at 190° C. for 20 hours to synthesize tetracyclo[6.2.1.1<3,6>0.0<2,7>]dodeca-4,9-diene. This is subjected to ozone oxidation in methanol at a temperature of at most −30° C., followed by oxidative destruction by using hydrogen peroxide in a solvent mixture of formic acid and acetic acid to obtain bicyclo[3.3.0]octane-2,4,6,8-tetracarboxylic acid (hereinafter referred to simply as BOTC), and this tetracarboxylic acid is subjected to heat treatment by acetic anhydride to obtain bicyclo[3.3.0]octane-2,4,6,8-tetracarboxylic dianhydride. Further, BOTC can be obtained by oxidation of tetracyclo[6.2.1.1<3,6>0.0<2,7>]dodeca-4,9-diene by potassium permanganate.

In the present invention, it is essential that a polyamic acid having repeating units using a tetracarboxylic acid component which has an alicyclic structure having from 2 to 5 rings condensed and wherein all the carbonyl groups are directly bonded to the alicyclic structure and said carbonyl groups are not bonded to adjacent carbon atoms in the alicyclic structure, or a polyimide, is incorporated. This tetracarboxylic acid component is incorporated in an amount of preferably at least 10 mol % based on the total tetracarboxylic acid component, and another tetracarboxylic acid component may be copolymerized therewith within a range of not impairing the object of the present invention.

Specific examples of which include aromatic tetracarboxylic acids such as pyromellitic acid, 2,3,6,7-naphthalenetetracarboxylic acid, 1,2,5,6-naphthalenetetracarboxylic acid, 1,4,5,8-naphthalenetetracarboxylic acid, 2,3,6,7-anthracenetetracarboxylic acid, 1,2,5,6-anthracenetetracarboxylic acid, 3,3',4,4'-biphenyltetracarboxylic acid, 2,3,3',4-biphenyltetracarboxylic acid, bis(3,4-dicarboxyphenyl) ether, 3,3',4,4'-benzophenonetetracarboxylic acid, bis(3,4-dicarboxyphenyl)sulfone, bis(3,4-dicarboxyphenyl)methane, 2,2-bis(3,4-dicarboxyphenyl)propane, 1,1,1,3,3,3-hexafluoro-2,2'-bis(3,4-dicarboxyphenyl)propane, bis(3,4-dicarboxyphenyl)dimethylsilane, bis(3,4-dicarboxyphenyl)diphenylsilane, 2,3,4,5-pyridinetetracarboxylic acid and 2,6-bis(3,4-dicarboxyphenyl)pyridine, alicyclic tetracarboxylic acids such as 1,2,3,4-cyclobutanetetracarboxylic acid, 1,2,3,4-cycloheptanetetracarboxylic acid, 2,3,4,5-tetrahydrofurantetracarboxylic acid, 1,2,4,5-cyclohexanetetracarboxylic acid, 3,4-dicarboxy-1-cyclohexylsuccinic acid and 3,4-dicarboxy-1,2,3,4-tetrahydro-1-naphthalenesuccinic acid, and aliphatic tetracarboxylic acids such as butanetetracarboxylic acid. They may be used as a mixture of at least two.

The diamine having the structure of $R^2$ in the general formula [I] is not particularly limited, and its specific examples include aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4,-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane and 2,2-bis[4-(4-aminophenoxy)phenyl]hexafluoropropane, alicyclic diamines such as bis(4-aminocyclohexyl)methane and bis(4-amino-3-methylcyclohexyl)methane, and aliphatic diamines such as 1,2-diaminoethane, 1,3-diaminopropane, 1,4-diaminobutane and 1,6-diaminohexane, and silicon diamines such as

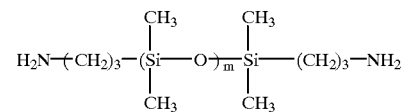

(wherein m is an integer of from 1 to 10). Further, diamines having a long chain alkyl group such as 4,4'-diamino-3-dodecyldiphenylether, 1-dodecanoxy-2,4'-diaminobenzene, 1,1-bis(4-aminophenyl)cyclohexane and 2,2-bis[4-(4-aminophenoxy)phenyl]octane, may be used. A mixture of at least two of these diamines may be used.

Further, although such diamine components are not particularly limited, a diamine having a long chain alkyl group or fluorine-containing alkyl group with a carbon number of from 6 to 20, is contained in an amount of at least 1 mol %, preferably from 5 mol % to 100 mol %, based on $R^2$, in order to obtain the tilt angle of liquid crystal. Diamines having such a structure include, in addition to diamines having a long chain alkyl group, such as 4,4'-diamino-3-dodecyldiphenylether, 1-dodecanoxy-2,4-diaminobenzene, 1,1-bis(4-aminophenyl)cyclohexane and 2,2-bis[4-(4-aminophenoxy)phenyl]octane, diamines such as 4-(4-trans-n-propylcyclohexylphenoxy)-1,3-diaminobenzene, 4-(4-trans-n-butylcyclohexylphenoxy)-1,3-diaminobenzene, 4-(4-trans-n-heptylcyclohexylphenoxy)-1,3-diaminobenzene, 4-(4-trans-n-pentylcyclohexylphenoxy)-1,3-diaminobenzene, 4-trans-n-propylbicyclohexyl-3,5-diaminobenzoate, 4-trans-n-butylbicyclohexyl-3,5-diaminobenzoate and 4-trans-n-pentylbicyclohexyl-3,5-diaminobenzoate, and the following compounds:

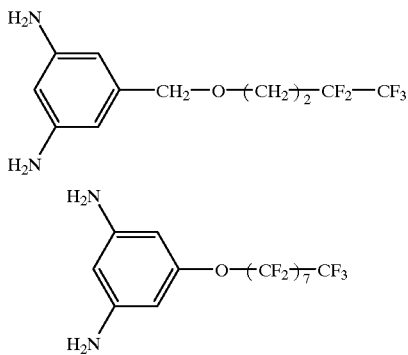

It is essential that the alignment treating agent of the present invention contains a polyamic acid containing repeating units using a tetracarboxylic acid component which has an alicyclic structure having from 2 to 5 rings condensed and wherein all the carbonyl groups are directly bonded to the alicyclic structure and said carbonyl groups are not bonded to adjacent methylene groups in the alicyclic structure, or a polyimide. Further, a polyamic acid represented by the general formula [VII]:

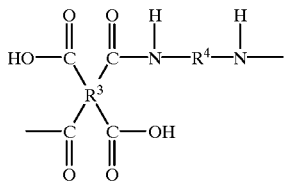

[VII]

(wherein $R^3$ is a tetravalent organic group constituting a tetracarboxylic acid, and $R^4$ is a bivalent organic group constituting a diamine) having a reduced viscosity of from 0.05 to 5.0 dl/g (in N-methylpyrrolidone at a temperature of 30° C., at a concentration of 0.5 g/dl) may be mixed therewith.

In this case, the mixing ratio is preferably such that the polyamic acid or the polyimide having repeating units of the present invention is at least 10 wt %, preferably from 10 to 80 wt %, based on the total polymer weight, in order to obtain uniform alignment of liquid crystal.

Specific examples of the tetracarboxylic acid constituting $R^3$ in the general formula [VII] include aromatic tetracarboxylic acids such as pyromellitic acid, 2,3,6,7-naphthalenetetracarboxylic acid, 1,2,5,6-naphthalenetetracarboxylic acid, 1,4,5,8-naphthalenetetracarboxylic acid, 2,3,6,7-anthracentetracarboxylic acid, 1,2,5,6-anthracenetetracarboxylic acid, 3,3',4,4'-biphenyltetracarboxylic acid, 2,3,3',4-biphenyltetracarboxylic acid, bis(3,4-dicarboxyphenyl) ether, 3,3',4,4'-benzophenonetetracarboxylic acid, bis(3,4-dicarboxyphenyl)sulfone, bis(3,4-dicarboxyphenyl) methane, 2,2-bis(3,4-dicarboxyphenyl)propane, 1,1,1,3,3,3-hexafluoro-2,2'-bis(3,4-dicarboxyphenyl)propane, bis(3,4-dicarboxyphenyl)dimethylsilane, bis(3,4-dicarboxyphenyl) diphenylsilane, 2,3,4,5-pyridinetetracarboxylic acid and 2,6-bis(3,4-dicarboxyphenyl)pyridine, alicyclic tetracarboxylic acids such as 1,2,3,4-cyclobutanetetracarboxylic acid, 1,2,3,4-cycloheptanetetracarboxylic acid, 2,3,4,5-tetrahydrofurantetracarboxylic acid, 1,2,4,5-cyclohexanetetracarboxylic acid, 3,4-dicarboxy-1-cyclohexylsuccinic acid, 3,4-dicarboxy-1,2,3,4-tetrahydro-1-naphthalenesuccinic acid and bicyclo[3,3,0]-octane-2,4,6,8-tetracarboxylic acid, and aliphatic tetracarboxylic acids such as butanetetracarboxylic acid. They may be used as a mixture of at least two. An alicyclic tetracarboxylic acid is preferred to obtain a high voltage holding property, and more preferred is 1,2,3,4-cyclobutanetetracarboxylic acid or bicyclo[3,3,0]-octane-2,4,6,8-tetracarboxylic acid.

Specific examples of $R^4$ in the general formula [VII] include aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl-4-aminophenyl) methane, diaminodiphenylsulfone, diaminobenzophenone, diaminonaphthalene, 1,4-bis(4-aminophenoxy)benzene, 1,4,-bis(4-aminophenyl)benzene, 9,10-bis(4-aminophenyl) anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl) hexafluoropropane and 2,2-bis[4-(4-aminophenoxy)phenyl] hexafluoropropane, alicyclic diamines such as bis(4-aminocyclohexyl)methane and bis(4-amino-3-methylcyclohexyl)methane, and aliphatic diamines such as 1,2-diaminoethane, 1,3-diaminopropane, 1,4-diaminobutane and 1,6-diaminohexane, and silicon diamines such as

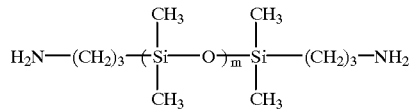

(wherein m is an integer of from 1 to 10). Further, diamines having a long chain alkyl group, such as 4,4'-diamino-3-dodecyldiphenylether, 1-dodecanoxy-2,4'-diaminobenzene, 1,1-bis(4-aminophenyl)cyclohexane and 2,2-bis[4-(4-aminophenoxy)phenyl]octane, may be used. A mixture of at least two of these diamines may also be used.

The treating agent for liquid crystal alignment of the present invention may be used as a polyamic acid obtained by reacting an acid dianhydride with a diamine in a solvent. However, it is preferred to convert the polyamic acid into an imide in the solvent to obtain a solvent-soluble polyimide, in order to obtain a high voltage holding property at a high temperature. In such a case, the imidization degree a% is 0<a≦100%, and in order to obtain a higher voltage holding property, it is preferably 20≦a≦100%, more preferably 50≦a≦100%.

In the case where the treating agent for liquid crystal alignment of the present invention is used as a solution of a polyamic acid as a polyimide precursor, and in the case where it is used as a solution of the polyamic acid represented by the general formula [VII], the method for producing the polyamic acid is not particularly limited. However, it is common to react a tetracarboxylic dianhydride with a diamine in an organic polar solvent. In this case, the molar ratio of the tetracarboxylic dianhydride to the diamine is preferably from 0.8 to 1.2. The closer to 1 the molar ratio, the higher the polymerization degree of the polymer to be produced, similar to a conventional condensation polymerization reaction. If the polymerization degree is too low, the strength of the polyimide coating film tends to be inadequate, and if the polymerization degree is too high, workability during formation of the polyimide coating film tends to be poor. Accordingly, the polymerization degree of the formed product in the present invention is preferably from 0.05 to 5.0 dl/g (in N-methylpyrrolidone at a temperature of 30° C. at a concentration of 0.5 g/dl) as calculated as the reduced viscosity of the polyamic acid solution.

Specific examples of the solvent to be used for the solution polymerization, include N-methyl-2-pyrrolidone, N,N-dimethylformamide, N,N-dimethylacetamide, N-methylcaprolactam, dimethylsulfoxide, tetramethylurea, pyridine, dimethylsulfone, hexamethylphosphoramide and butyrolactone. They may be used alone or as a mixture. Further, a solvent dissolving no polyimide precursor may be added to the above solvent within a range where a uniform solution can be obtained. The reaction temperature for the solution polymerization can be selected optionally within a range of from −20° C. to 150° C., preferably from −5° C. to 100° C.

In the case where the treating agent for liquid crystal alignment of the present invention is used as a solvent-soluble polyimide solution, its production method is not particularly limited, and a polyamic acid obtained by reacting a tetracarboxylic dianhydride with a diamine, may be imidized directly in the solution to obtain the solvent-soluble polyimide solution. In this case, to convert the polyamic acid into a polyimide, a method of dehydration ring-closure by heating or a method of chemical ring-closure by means of a known dehydration ring-closure catalyst, may be employed. In the method by heating, the temperature can be selected optionally within a range of from 100° C. to 300° C., preferably from 120° C. to 250° C. In the method of chemical ring-closure, e.g. pyridine or triethylamine may be used in the presence of e.g. acetic anhydride, and the temperature in this case can be selected optionally within a range of from −20° C. to 200° C.

The polyimide solution thus obtained may be used directly, or the polyimide may be used as a powder precipitated and isolated from a poor solvent such as methanol or ethanol, or the polyimide powder may be redisssolved in a suitable solvent. The solvent for redissolution is not particularly limited so long as it dissolves the obtained polyimide, and specific examples of which include 2-pyrrolidone, N-methylpyrrolidone, N-ethylpyrrolidone, N-vinylpyrrolidone, N,N-dimethylacetamide, N,N-dimethylformamide and γ-butyrolactone.

Further, even a solution dissolving no polymer by itself, may be added to the above solvent within a range of not impairing the solubility. Specific examples of which include ethylcellosolve, butylcellosolve, ethylcarbitol, butylcarbitol, ethylcarbitol acetate, ethylene glycol, 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethylether-2-acetate, propylene glycol-1-monoethylether-2-acetate, dipropylene glycol, 2-(2-ethoxypropoxy)propanol, methylester lactate, ethylester lactate, n-propylester lactate, n-butylester lactate and isoamylester lactate.

The content of the polyamic acid or the solvent-soluble polyimide in the treating agent for liquid crystal alignment of the present invention thus obtained, is not particularly limited so long as the solution is uniform. However, it is usually from 1 to 15 wt %, preferably from 2 to 8 wt %, as a solid content.

Further, with a purpose of further improving the adhesive properties of a polyimide resin film to a substrate, an additive such as a coupling agent may be added to the obtained resin solution.

The treating agent for liquid crystal alignment of the present invention is coated on a transparent substrate of e.g. glass or plastic provided with transparent electrodes, followed by baking, to prepare a polyimide film, and its surface is subjected to rubbing treatment to obtain a liquid crystal alignment film. As the method of coating the treating agent for liquid crystal alignment, a known method such as spin coating or flexographic printing may, for example, be employed.

EXAMPLES

Now, the present invention will be described in further detail with reference to Examples. However, it should be understood that the present invention is by no means restricted thereto.

Here, bicyclo[3,3,0]octane-2,4,6,8-tetracarboxylic dianhydride used in Examples was one having a content of the isomer [IV] of 97%.

Example 1

4.50 g (0.018 mol) of bicyclo[3,3,0]octane-2,4,6,8-tetracarboxylic dianhydride (hereinafter referred to simply as BODA), 0.68 g (0.0018 mol) of 4-(4-trans-n-pentylcyclohexylphenoxy)-1,3-diaminobenzene and 1.75 g (0.0162 mol) of p-phenylenediamine were reacted in 39.3 g of N-methylpyrrolidone (hereinafter referred to simply as NMP) at room temperature, and further reacted at 40° C. for 43 hours. The reduced viscosity of the obtained polyamic acid was 0.97 dl/g (0.5 g/dl, in NMP at 30° C.).

To 42 g of this polyamic acid solution, NMP was added to prepare a solution of 1 wt %, and 4.18 g of acetic anhydride and 6.48 g of pyridine as imidization catalysts were added thereto, followed by reaction at room temperature for 30 minutes and at 120° C. for 2 hours. This solution was introduced into a large amount of methanol, and the obtained white precipitate was collected by filtration and dried to obtain a white polyimide powder. The imidization degree of the obtained polyimide powder was measured, and it was 72%.

0.6 g of this powder was dissolved in 9.4 g of γ-butyrolactone to prepare a solution having a solid content concentration of 6 wt %. This solution was flexographically printed on a glass substrate provided with transparent electrodes, whereupon a uniform coating film was obtained.

Further, this solution was spin coated at 3,500 rpm on a glass substrate provided with transparent electrodes followed by baking at 200° C. for 1 hour to prepare a polyimide film having a film thickness of 100 nm. This coating film was rubbed with a cloth, and the surface appearance of the alignment film was observed by a microscope, whereupon no separation or abrasion was seen.

Then, to measure electrical properties of the liquid crystal cell, using substrates having a polyimide film formed and rubbed in the same manner as above, spacers of 6 μm were spread on the film surface, then the substrates were fabricated so that the rubbing directions would be at right angles, and liquid crystal MLC-2003 (manufactured by Merck Co.) or ZLI-2293 (manufactured by Merck Co.) was injected to prepare a 90° C. twist liquid crystal cell. The alignment state of the liquid crystal in this cell was observed by a polarization microscope to confirm a uniform alignment without defects.

With respect to this liquid crystal cell, the voltage holding ratio was measured and found to show a high voltage holding property of 99% at 23° C. and 85% at 90° C. with respect to the liquid crystal cell using MLC-2003, and 98% at 23° C. and 70% at 90° C. with respect to the liquid crystal cell using ZLI-2293.

Further, the tilt angle of the liquid crystal cell was measured by crystal rotation method, and found to be 4.1° with respect to the liquid crystal cell using MLC-2003.

Example 2

To the polyamic acid solution of 1 wt % prepared and diluted in the same manner as in Example 1, 4.18 g of acetic anhydride and 6.48 g of pyridine were added and reacted at room temperature for 30 minutes and at 120° C. for 4 hours. This solution was introduced into a large amount of methanol, and the obtained white precipitate was collected by filtration and dried to obtain a white polyimide powder. The imidization degree of the obtained polyimide powder was measured, and it was 80%.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 85% at 90° C. with respect to the liquid crystal cell using MLC-2003, and 98% at 23° C. and 76% at 90° C. with respect to the liquid crystal cell using ZLI-2293.

Further, the tilt angle of the liquid crystal cell was measured by crystal rotation method, and found to be 4.0° with respect to the liquid crystal cell using MLC-2003.

Example 3

4.50 g (0.018 mol) of BODA, 0.68 g (0.0018 mol) of 4-(4-trans-n-pentylcyclohexylphenoxy)-1,3-diaminobenzene and 3.21 g (0.0162 mol) of 4,4'-diaminodiphenylethane were reacted in 47.5 g of NMP at room temperature for 48 hours to obtain a polyamic acid solution having a reduced viscosity of 0.91 dl/g (0.5 g/dl, in NMP at 30° C.).

To 42 g of this polyamic acid solution, NMP was added to prepare a solution of 1 wt %, and 4.18 g of acetic anhydride and 6.48 g of pyridine as imidization catalysts were added thereto, followed by reaction at room temperature for 30 minutes and at 120° C. for 2 hours. This solution was introduced into a large amount of methanol, and the obtained white precipitate was collected by filtration and dried to obtain a white polyimide powder. The imidization degree of the obtained polyimide powder was 70%.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 84% at 90° C. with respect to the liquid crystal cell using MLC-2003, and 98% at 23° C. and 70% at 90° C. with respect to the liquid crystal cell using ZLI-2293.

Further, the tilt angle of the liquid crystal cell was measured by crystal rotation method, and found to be 2.7° with respect to the liquid crystal cell using MLC-2003.

Example 4

4.50 g (0.018 mol) of BODA, 1.36 g (0.0036 mol) of 4-(4-trans-n-pentylcyclohexylphenoxy)-1,3-diaminobenzene and 1.56 g (0.0144 mol) of p-phenylenediamine were reacted in 39.3 g of NMP at room temperature for 48 hours to obtain a polyamic acid solution having a reduced viscosity of 0.90 dl/g (0.5 g/dl, in NMP at 30° C.).

To 10.5 g of this polyamic acid solution, NMP was added to prepare a solution of 1 wt %, and 1.05 g of acetic anhydride and 1.62 g of pyridine as imidization catalysts were added thereto, followed by reaction at room temperature for 30 minutes and at 105° C. for 2 hours. This solution was introduced into a large amount of methanol, and the obtained white precipitate was collected by filtration and dried to obtain a white polyimide powder. The imidization degree of the obtained polyimide powder was 50%.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 83% at 90° C. with respect to the liquid crystal cell using MLC-2003, and 98% at 23° C. and 75% at 90° C. with respect to the liquid crystal cell using ZLI-2293.

Example 5

To the polyamic acid solution of 1 wt % prepared and diluted in the same manner as in Example 4, 1.05 g of acetic anhydride and 1.62 g of pyridine were added and reacted at room temperature for 30 minutes and at 120° C. for 2 hours. This solution was introduced into a large amount of methanol, and the obtained white precipitate was collected by filtration and dried to obtain a white polyimide powder. The imidization degree of the obtained polyimide powder was 72%.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 88% at 90° C. with respect to the liquid crystal cell using MLC-2003, and 98% at 23° C. and 82% at 90° C. with respect to the liquid crystal cell using ZLI-2293.

Example 6

To the polyamic acid solution of 1 wt % prepared and diluted in the same manner as in Example 4, 1.26 g of acetic anhydride and 0.21 g of triethylamine were added and reacted at room temperature for 30 minutes and at 120° C. for 2 hours. This solution was introduced into a large amount of methanol, and the obtained white precipitate was collected by filtration and dried to obtain a white polyimide powder. The imidization degree of the obtained polyimide powder was 90%.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 86% at 90° C. with respect to the liquid crystal cell using MLC-2003, and 98% at 23° C. and 80% at 90° C. with respect to the liquid crystal cell using ZLI-2293.

Example 7

4.50 g (0.018 mol) of BODA, 1.36 g (0.0036 mol) of 4-hexadecanoxy-2.4-diaminobenzene and 1.56 g (0.0144 mol) of p-phenylenediamine were reacted in 39.3 g of NMP at room temperature for 48 hours to obtain a polyamic acid solution having a reduced viscosity of 0.96 dl/g (0.5 g/dl, in NMP at 30° C.).

To 42 g of this polyamic acid solution, NMP was added to prepare a solution of 1 wt %, and 4.18 g of acetic anhydride and 6.48 g of pyridine as imidization catalysts were added thereto, followed by reaction at room temperature for 30 minutes and at 120° C. for 2 hours. This solution was introduced into a large amount of methanol, and the obtained white precipitate was collected by filtration and dried to obtain a white polyimide powder. The imidization degree of the obtained polyimide powder was 72%.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 83% at 90° C. with respect to the liquid crystal cell using MLC-2003, and 98% at 23° C. and 76% at 90° C. with respect to the liquid crystal cell using ZLI-2293.

Further, the tilt angle of the liquid crystal cell was measured by crystal rotation method, and found to be 5.5° with respect to the liquid crystal cell using MLC-2003. Further, rectangular waves of 30 Hz/±3V having a direct current of 3V superimposed thereon were applied to the liquid crystal cell at 23° C. for 60 minutes, and immediately after the direct current voltage was cut off, the residual DC voltage remaining in the liquid crystal cell was measured by an optical flicker elimination method and found to be 1.1V.

Example 8

4.37 g (0.0175 mol) of BODA, 0.38 g (0.001 mol) of n-octadecylsuccinic anhydride, 1.56 g (0.0144 mol) of p-phenylenediamine, 0.71 g (0.0030 mol) of 4,4'-diaminodiphenylmethane and 1.36 g (0.0036 mol) of hexadecanoxy-2,4-diaminobenzene were reacted in 39.8 g of NMP at room temperature for 48 hours to obtain a polyamic acid solution having a reduced viscosity of 0.90 dl/g (0.5 g/dl, in NMP at 30° C.).

To 42 g of this polyamic acid solution, NMP was added to prepare a solution of 1 wt %, and 4.18 g of acetic anhydride and 6.48 g of pyridine as imidization catalysts were added thereto, followed by reaction at room temperature for 30 minutes and at 120° C. for 2 hours. This solution was introduced into a large amount of methanol, and the obtained white precipitate was collected by filtration and dried to obtain a white polyimide powder. The imidization degree of the obtained polyimide powder was 72%.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 85% at 90° C. with respect to the liquid crystal cell using MLC-2003, and 98% at 23° C. and 81% at 90° C. with respect to the liquid crystal cell using ZLI-2293.

Further, the tilt angle of the liquid crystal cell was measured by crystal rotation method, and found to be 5.3° with respect to the liquid crystal cell using MLC-2003.

Example 9

4.50 g (0.018 mol) of BODA, 1.56 g (0.0144 mol) of p-phenylenediamine, 0.36 g (0.0018 mol) of 4,4'-diaminodiphenylmethane and 0.68 g (0.0018 mol) of 4-hexadecanoxy-2,4-diaminobenzene were reacted in 46.4 g of NMP at room temperature for 48 hours to obtain a polyamic acid solution having a reduced viscosity of 0.92 dl/g (0.5 g/dl, in NMP at 30° C.).

To 42 g of this polyamic acid solution, NMP was added to prepare a solution of 1 wt %, and 4.18 g of acetic anhydride and 6.48 g of pyridine as imidization catalysts were added thereto, followed by reaction at room temperature for 30 minutes and at 120° C. for 2 hours. This solution was introduced into a large amount of methanol, and the obtained white precipitate was collected by filtration and dried to obtain a white polyimide powder. The imidization degree of the obtained polyimide powder was 70%.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 86% at 90° C. with respect to the liquid crystal cell using MLC-2003, and 98% at 23° C. and 80% at 90° C. with respect to the liquid crystal cell using ZLI-2293.

Example 10

10.81 g (0.1 mol) of p-phenylenediamine was dissolved in 203 g of NMP, and 19.22 g (0.98 mol) of cyclobutanetetracarboxylic dianhydride was added thereto, followed by reaction at room temperature for 4 hours to obtain a polyamic acid solution having a reduced viscosity of 0.98 dl/g (0.5 g/dl, in NMP at 30° C.). This solution was diluted to have a solid content concentration of 6 wt % to obtain a polyamic acid solution (A-1).

The polyamic acid solution (A-1) was mixed with the soluble polyimide solution (S-1) having a solid content concentration of 6 wt %, polymerized and imidized in Example 7, with a weight ratio of (S-1) to (A-1) of 1 to 4, and adequately stirred to obtain a uniform solution.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 81% at 90° C. with respect to the liquid crystal cell using MLC-2003, and 98% at 23° C. and 73% at 90° C. with respect to the liquid crystal cell using ZLI-2293.

Further, the tilt angle of the liquid crystal cell was measured by crystal rotation method, and found to be 6.0° with respect to the liquid crystal cell using MLC-2003. Further, rectangular waves of 30 Hz/±3V having a direct current of 3V superimposed thereon were applied to the liquid crystal cell at 23° C. for 60 minutes, and immediately after the direct current voltage was cut off, the residual DC voltage remaining in the liquid crystal cell was measured by an optical flicker elimination method and found to be 0.1V.

Example 11

20.02 g (0.1 mol) of 4,4'-diaminodiphenyl ether was dissolved in 225 g of NMP, and 19.22 g (0.98 mol) of cyclobutanetetracarboxylic dianhydride was added thereto, followed by reaction at room temperature for 4 hours to obtain a polyamic acid solution having a reduced viscosity of 0.98 dl/g (0.5 g/dl, in NMP at 30° C.). This solution was diluted to have a solid content concentration of 6 wt % to obtain a polyamic acid solution (A-2).

The polyamic acid solution (A-2) was mixed with the soluble polyimide solution (S-1) having a solid content concentration of 6 wt %, polymerized and imidized in Example 7, with a weight ratio of (S-1) to (A-2) of 1 to 4, and adequately stirred to obtain a uniform solution.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 82% at 90° C. with respect to the liquid crystal cell using MLC-2003, and 98% at 23° C. and 81% at 90° C. with respect to the liquid crystal cell using ZLI-2293.

Further, the tilt angle of the liquid crystal cell was measured by crystal rotation method, and found to be 6.1° with respect to the liquid crystal cell using MLC-2003. Further, rectangular waves of 30 Hz/±3V having a direct current of 3V superimposed thereon were applied to the liquid crystal cell at 23° C. for 60 minutes, and immediately after the direct current voltage was cut off, the residual DC voltage remaining in the liquid crystal cell was measured by an optical flicker elimination method and found to be 0.2V.

Example 12

19.83 g (0.1 mol) of 4,4'-diaminodiphenylmethane was dissolved in 224 g of NMP, and 19.22 g (0.98 mol) of cyclobutanetetracarboxylic dianhydride was added thereto, followed by reaction at room temperature for 4 hours to obtain a polyamic acid solution having a reduced viscosity of 0.96 dl/g (0.5 g/dl, in NMP at 30° C.). This solution was diluted to have a solid content concentration of 6 wt % to obtain a polyamic acid solution (A-3).

The polyamic acid solution (A-3) was mixed with the soluble polyimide solution (S-1) having a solid content concentration of 6 wt %, polymerized and imidized in Example 7, with a weight ratio of (S-1) to (A-3) of 1 to 4, and adequately stirred to obtain a uniform solution.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 82% at 90° C. with respect to the liquid crystal cell using MLC-2003, and 98% at 23° C. and 81% at 90° C. with respect to the liquid crystal cell using ZLI-2293.

Further, the tilt angle of the liquid crystal cell was measured by crystal rotation method, and found to be 6.0° with respect to the liquid crystal cell using MLC-2003. Further, rectangular waves of 30 Hz/±3V having a direct current of 3V superimposed thereon were applied to the liquid crystal cell at 23° C. for 60 minutes, and immediately after the direct current voltage was cut off, the residual DC voltage remaining in the liquid crystal cell was measured by an optical flicker elimination method and found to be 0.2V.

Example 13

20.02 g (0.1 mol) of 4,4'-diaminodiphenyl ether was dissolved in 255 g of NMP, and 25.02 g (0.1 mol) of BODA was added thereto, followed by reaction at room temperature for 24 hours to obtain a polyamic acid solution having a reduced viscosity of 0.97 dl/g (0.5 g/dl, in NMP at 30° C.). This solution was diluted to have a solid content concentration of 6 wt % to obtain a polyamic acid solution (A-4).

The polyamic acid solution (A-4) was mixed with the soluble polyimide solution (S-1) having a solid content concentration of 6 wt %, polymerized and imidized in Example 7, with a weight ratio of (S-1) to (A-4) of 1 to 4, and adequately stirred to obtain a uniform solution.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to show a high voltage holding property of 99% at 23° C. and 84% at 90° C. with respect to the liquid crystal cell using MLC-2003, and 98% at 23° C. and 82% at 90° C. with respect to the liquid crystal cell using ZLI-2293.

Further, the tilt angle of the liquid crystal cell was measured by crystal rotation method, and found to be 6.0° with respect to the liquid crystal cell using MLC-2003. Further, rectangular waves of 30 Hz/±3V having a direct current of 3V superimposed thereon were applied to the liquid crystal cell at 23° C. for 60 minutes, and immediately after the direct current voltage was cut off, the residual DC voltage remaining in the liquid crystal cell was measured by an optical flicker elimination method and found to be 0V.

Example 14

The polyamic acid solution polymerized in Example 4 was diluted with NMP to prepare a polyamic acid solution (A-5) of 6 wt %.

Further, the polyamic acid solution (A-5) was mixed with the soluble polyimide solution (S-2) having a solid content concentration of 6 wt %, polymerized and imidized in Example 8, with a weight ratio of (S-2) to (A-5) of 1 to 4, and adequately stirred to obtain a uniform solution.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to shown a high voltage holding property of 99% at 23° C. and 83% at 90° C. with respect to the liquid crystal cell using MLC-2003, and 98% at 23° C. and 80% at 90° C. with respect to the liquid crystal cell using ZLI-2293.

Further, the tilt angle of the liquid crystal cell was measured by crystal rotation method and found to be 6.0° with respect to the liquid crystal cell using MLC-2003.

Example 15

The polyamic acid solution polymerized in Example 4 was diluted with NMP to prepare a polyamic acid solution (A-5) of 6 wt %.

Further, the polyamic acid solution (A-5) was mixed with the soluble polyimide solution (S-4) having a solid content concentration of 6 wt %, polymerized and imidized in Example 10, with a weight ratio of (S-4) to (A-5) of 1 to 4, and adequately stirred to obtain a uniform solution.

Then, a polyimide film was prepared in the same manner as in Example 1, and the printing property state was observed to confirm that a uniform coating film was obtained. Further, after rubbing, the surface appearance of the film was confirmed by a polarization microscope, whereupon no separation or abrasion of the film due to rubbing was seen. Further, the voltage holding property of the liquid crystal cell was evaluated and confirmed to shown a high voltage holding property of 99% at 23° C. and 83% at 90° C. with respect to the liquid crystal cell using MLC-2003.

Comparative Example 1

30.3 g (0.1 mol) of 3,4-dicarboxy-1,2,3,4-tetrahydro-1-naphthalenesuccinic dianhydride, 9.72 g (0.09 mol) of p-phenylenediamine and 3.48 g (0.01 mol) of 1-hexadecanoxy-2,4-diaminobenzene were reacted in 245 g of NMP at room temperature for 10 hours, to prepare a polyamic acid solution.

To 50 g of this polyamic acid solution, 10.8 g of acetic anhydride and 5.0 g of pyridine as imidization catalysts were added, followed by reaction at 50° C. for 3 hours to prepare a polyimide solution. This solution was introduced into a large amount of methanol, and the obtained white precipitate was collected by filtration and dried to obtain a white polyimide powder. The imidization degree of the obtained polyimide powder was 90%.

0.6 g of this powder was dissolved in 9.4 g of γ-butyrolactone to prepare a solution having a solid content concentration of 6%. This solution was spin coated at 3,000 rpm on a glass substrate provided with transparent electrodes, followed by baking at 200° C. for 1 hour to obtain a polyimide film having a film thickness of 100 nm.

This coating film was rubbed under the same condition as in Example 1, and the surface appearance of the alignment film was observed by means of a microscope, whereupon abrasion of the film was seen. A liquid crystal cell was prepared in the same manner as in Example 1 by using this polyimide film, whereupon the tilt angle was 5.0°.

Further, the voltage holding ratio of a twist cell prepared in the same manner as in Example 1, was measured and found to be 97% at 23° C. and 42% at 105° C. with respect to the liquid crystal cell using MLC-2003 and 96% at 23° C. and 49% at 80° C. with respect to the liquid crystal cell using ZLI-2293, and the voltage holding ratio was low particularly at a high temperature.

Comparative Example 2

A twist cell was prepared in the same manner as in Example 1 using the polyamic acid solution (A-1) prepared in Example 10, and the voltage holding ratio of the liquid crystal cell was measured and found to be 94% at 23° C. and 50% at 80° C. with respect to the liquid crystal cell using MLC-2003, and the voltage holding ratio was low particularly at a high temperature.

Industrial Applicability

The treating agent for liquid crystal alignment containing the polyamic acid or the solvent-soluble polyimide of the present invention, is excellent in printing property on a substrate, and provides a liquid crystal alignment film having no separation nor abrasion during rubbing, even in the case of the solvent-soluble polyimide. Further, the voltage holding ratio is high at a high temperature, and a liquid crystal display device having a high reliability and excellent properties can be prepared.

What is claimed is:

1. A treating agent for liquid crystal alignment, which comprises a polyamic acid compound having a reduced viscosity of from 0.05 to 5.0 dl/g (in N-methylpyrrolidone at a temperature of 30° C. at a concentration of 0.5 g/dl) and containing repeating units represented by the general formula [I]:

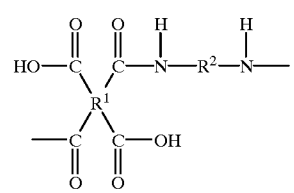

(wherein $R^1$ is a tetravalent organic group constituting a tetracarboxylic acid which has an alicyclic structure having from 2 to 5 rings condensed and wherein all the carbonyl groups are directly bonded to the alicyclic structure and said carbonyl groups are not bonded to adjacent carbon atoms in the alicyclic structure, and $R^2$ is a bivalent organic group constituting a diamine) or a polyimide compound obtained by imidizing said polyamic acid compound.

2. The treating agent for liquid crystal alignment according to claim 1, wherein $R^1$ in the general formula [I] is a tetravalent organic group constituting a tetracarboxylic acid represented by the general formula [II]:

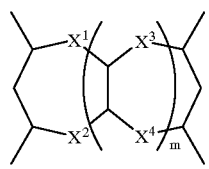

[II]

(wherein each of $X^1$, $X^2$, $X^3$ and $X^4$ which are independent of one another, is a single bond or a methylene group, and m is an integer of from 1 to 3).

3. The treating agent for liquid crystal alignment according to claim 1, wherein $R^1$ in the general formula [I] is a tetravalent organic group constituting a tetracarboxylic acid represented by the formula [III]:

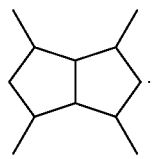

[III]

4. The treating agent for liquid crystal alignment according to claim 1, wherein the formula [III] is a single component selected from isomers of the formulae [IV] to [VI], or a mixture thereof:

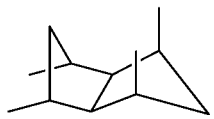

[IV]

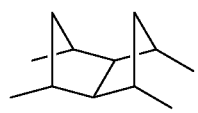

[V]

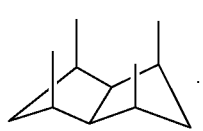

[VI]

5. The treating agent for liquid crystal alignment according to claim 1, which comprises at least one member selected from polymers having an imidization degree a% of $0<a\leq100\%$ of the polyimide obtained by imidizing the polyamic acid compound represented by the general formula [I].

6. The treating agent for liquid crystal alignment according to claim 1, wherein $R^2$ in the general formula [I] comprises a bivalent organic group constituting a diamine having a long chain alkyl group with a carbon number of at least 6, or a fluorine-containing alkyl group with a carbon number of at least 6.

7. A treating agent for liquid crystal alignment, wherein the polyamic acid compound represented by the general formula [I] of claim 1 or the polyimide compound obtained by imidizing said polyamic acid compound, is mixed in an amount of at least 10 wt % based on the total polymer weight, with a polyamic acid compound represented by the general formula [VII]:

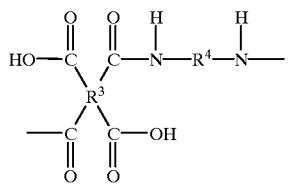

[VII]

wherein $R^3$ is a tetravalent organic group constituting a tetracarboxylic acid, and $R^4$ is a bivalent organic group constituting a diamine having a reduced viscosity of from 0.05 to 5.0 dl/g in N-methylpyrrolidone at a temperature of 30° C. at s concentration of 0.5 g/dl.

8. The treating agent for liquid crystal alignment according to claim 7, wherein, in the polyamic acid compound of the general formula [VII], $R^3$ contains a tetravalent organic group constituting an aliphatic tetracarboxylic dianhydride.

9. A liquid crystal alignment film obtained by coating on a substrate the treating agent for liquid crystal alignment as in one of claims 1–8, followed by baking, and then applying rubbing treatment to the surface of the coating film.

10. A liquid crystal device which comprises a liquid crystal alignment film obtained by coating on a substrate the treating agent for liquid crystal alignment as in one of claims 1–8, followed by baking, and then applying rubbing treatment to the surface of the coating film.

11. The treating agent for liquid crystal alignment according to claim 1, wherein $R^1$ in the general formula [I] is a tetravalent organic group constituting a tetracarboxylic acid represented by general formulas [VIII], [IX], [X] or [XI]:

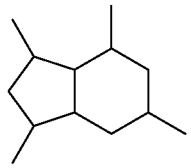

[VIII]

[IX]
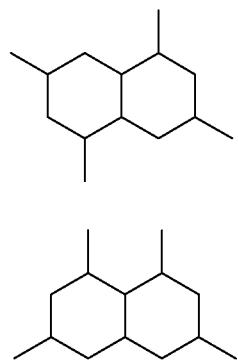
[X]
[XI]
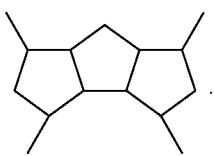
12. The treating agent for liquid crystal alignment according to claim 1, wherein $R^2$ is selected from the group consisting of aromatic diamines, alicyclic diamines, aliphatic diamines and silicon diamines, or mixtures thereof.
* * * * *